Aug. 23, 1966  H. N. MULDER ETAL  3,268,569
PROCESS FOR PREPARING ALUMINUM TRIALKYLS
Filed Oct. 11, 1960
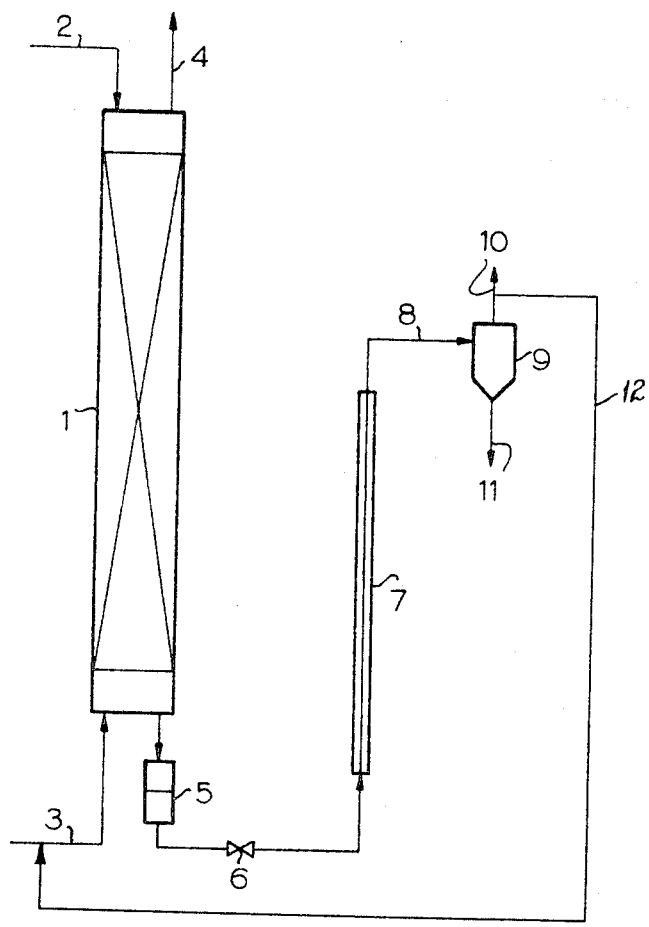

United States Patent Office 3,268,569
Patented August 23, 1966

3,268,569
PROCESS FOR PREPARING ALUMINUM TRIALKYLS
Harm N. Mulder and Jacobus P. Schuhmacher, Sittard, Netherlands, assignors to Stamicarbon N.V., Heerlen, Netherlands
Filed Oct. 11, 1960, Ser. No. 61,858
Claims priority, application Netherlands, Oct. 16, 1959, 244,448
3 Claims. (Cl. 260—448)

The present invention relates to a process for preparing aluminum trialkyls by reacting an olefin with a hydride of aluminum, e.g. aluminum trihydride ($AlH_3$), a monoalkyl aluminum hydride ($AlRH_2$) or, more particularly, a dialkyl aluminum hydride ($AlR_2H$).

It is known (see East-German patent specification No. 14,808) to carry out this process by passing a liquid containing dialkyl aluminum hydride, if desired, in a liquid vehicle, together with an olefin, such as ethylene, propylene, isobutylene, etc. from the bottom upwards through an oblong reactor at a temperature of 50–80° C., preferably at 60–65° C. The reaction product leaving the reactor is subsequently passed into a distillation column where the gaseous constituents are separated from a liquid phase which contains the aluminum trialkyl.

This known process presents various disadvantages. First, the aluminum trialkyl obtained in the said liquid phase contains undesired, higher alkyl groups bound to aluminum, which groups are partly formed during the reaction and have partly been present in the original hydride-containing liquid. The liquid containing dialkyl aluminum hydride can be prepared either by reaction of aluminum with hydrogen and aluminum trialkyl, as has been described, for example, in the East-German patent specification No. 14,808, or by direct synthesis from aluminum, hydrogen and an olefin, as has been described, for example, in the British patent specification No. 770,707.

In both cases, the dialkyl aluminum hydride contains higher alkyl groups bound to aluminum, especially, where the diethyl aluminum hydride is concerned. In addition, the hydride mostly contains hydrogen and gaseous hydrocarbons, which have been formed by dimerization or trimerization of the olefin used and/or by hydrogenation.

In the above mentioned known process for preparing aluminum trialkyls, the higher alkyl groups bound to aluminum occur in the final product, which is undesirable. The above mentioned gaseous hydrocarbons, insofar as they are not bound to aluminum, become mixed with the gaseous constituents which are separated from the resulting reaction product, as a result of which, these gaseous constituents have to be subjected to a purification treatment before they can be returned into the process.

Another disadvantage of the known process is that, in order to prevent hydrogenation of the olefin to be used, the hydrogen present in the dialkyl aluminum hydride has preliminarily to be separated off.

Furthermore, the known process has the disadvantage that, in order to prevent undesirable violent reactions, it has to be carried out at a relatively low temperature (50–80° C.), or at a relatively low olefin pressure, e.g. 1 atmosphere, as a result of which the capacity of the reactor used is comparatively small.

The invention aims at providing a process which overcomes the above mentioned objections. A process especially desired is one in which, during the preparation of aluminum trialkyls, the gaseous constituents released during the process are simultaneously purified, so that a gas fraction is obtained which can be returned immediately. In addition, a process is desired in which the undesired alkyl groups present in the starting product are simultaneously re-alkylated to the desired alkyl groups. Other advantages of the process according to the invention will be discussed hereinafter.

The process according to the invention for preparing aluminum trialkyls, in which a liquid containing a hydride of aluminum is brought into contact in an oblong reactor with a gaseous olefin, following which the resultant reaction product is passed into a zone in which the gaseous constituents are separated from a liquid phase containing the aluminum trialkyl, is characterized in that the liquid containing a hydride of aluminum is passed downwardly through the reactor which is provided with contact devices and which, below the inlet of the hydride-containing liquid, preferably at its bottom, communicates with a space containing the olefin at a constant or almost constant pressure, while a gas phase is discharged from the top of this reactor.

As a gas phase is discharged from the top of the reactor, an upward gas flow is formed in the reactor, so that the partial pressure of the gaseous olefin used decreases towards the top. If the gas phase be discharged relatively slowly, then, it contains but little of the olefin, whereas it contains large amounts of the hydrogen and gaseous hydrocarbons present in the starting product. It has been found that the discharge of the gas phase from the top of the reactor can be so controlled that less than 10% by volume of the gas phase discharged consists of the olefin used. This offers the advantage that this gas phase can be removed from the process without objection and can be used, for example, for combustion purposes.

The downflowing liquid containing the hydride takes up the amount of olefin necessary for the formation of the aluminum trialkyl while, in addition, an appreciable amount of olefin dissolves in the liquid. Preferably, no gaseous phase, but only a liquid phase which, therefore, contains dissolved olefin, is discharged from the bottom of the reactor. This liquid phase is passed into a zone wherein it expands and the gaseous constituents are separated from the liquid ones. The gaseous constituents now consist completely or almost completely of the gaseous olefin, which has the great advantage that they can be returned directly into the process. The liquid constituents contain only a small quantity of undesired higher alkyl groups, even less than the quantity of the higher alkyl groups originally present in the starting material. The residence time of the liquid phase in the tubular reactor is so chosen that the reaction forming the aluminum trialkyl is complete or almost complete. If, for example, aluminum triethyl is so prepared that a temperature of 100–120° C. occurs in the reactor at a pressure of about 16 atm. gauge, a residence time of about 5 minutes suffices. If the process is carried out at a higher or lower temperature or pressure, then, the residence time is correspondingly adjusted. In general, it can be stated that the residence time is the shorter the higher the temperature and/or pressure. An increase of the pressure, for example, to 20, 50 to 100 atm., has the additional advantage that the conversion of the hydride into the aluminum trialkyl proceeds more completely. Attention is drawn to an article by Ziegler (Ann. Vol. 629, pp. 124 and 148—1960), which states that at very high partial ethylene pressures (126 atm.) and temperatures—over 125° C.—explosions can occur.

It is remarkable that in the process according to the invention, there are hardly formed any higher alkyl groups bound to aluminum, in particular, if aluminum triethyl is prepared. On the face of it, this reaction—which has been described, inter alia, in the British patent specification No. 770,707, page 6, lines 56 to 81—will be expected to take place since, in the process according to the invention, other than in the known process according to the East-German patent specification No. 14,808, there are present at the same time in the lower part of the reactor a high partial ethylene pressure and a high aluminum triethyl concentration. No explanation can be given at the moment for the non-occurrence of this polymerization reaction, which is to be expected particularly with ethylene and at the comparatively high reaction temperature of, for example, 100–120° C.

The invention will be further explained with reference to the accompanying drawing.

Into a tubular reactor 1 full of contact devices, such as Raschig rings, polyethylene rings, bubble caps, or perforated plates, the liquid containing the dialkyl aluminum hydride to be converted is introduced at the top via conduit 2. The reactor 1 communicates with a conduit 3 containing the olefin at a constant or almost constant pressure. The olefin may be supplied to conduit 3 by means of, for example, a reducing valve or a diaphragm pump. The vent gases are allowed to escape from the top of reactor 1 via conduit 4. From the bottom of reactor 1, the reaction product is taken via a liquid seal 5 and an expansion valve 6 to an evaporator 7. The products leaving the evaporator 7 are passed via conduit 8 to a gas-liquid separator 9, from which the gaseous constituents are removed va conduit 10 and either vented or recycled via conduit 12, and the liquid phase—which contains the trialkyl aluminum—is discharged via a conduit 11.

The process according to the invention can also be applied if a complete conversion to the trialkyl aluminum is not aimed at, but, for example, the object is to obtain a product composed of 50% diethyl aluminum and 50% triethyl aluminum hydride. The residence time should in this case be adapted to the result desired.

It is not necessary to use an olefin containing an equal number of carbon atoms to those of the alkyl groups already present in the hydride. For example, triethyl aluminum can be prepared by treating diisobutyl aluminum hydride with ethylene, preferably, in the presence of colloidal nickel. The trialkyl aluminum can be put to various uses; it can be used, for example, as a catalyst in the dimerization of propylene or, in combination with titanium tetrachloride, as a catalyst in the polymerization of olefins. It is also possible to make the trialkyl aluminum react with an olefin, e.g. ethylene, to form compounds containing higher alkyl groups.

The invention will be further illustrated in the following examples:

*Example 1*

Use is made of a tubular reactor 1 having an internal diameter of 100 mm., with a concentric inner tube having an external diameter of 57 mm. The reactor is about 4 meters long and is filled with aluminum rings. The reactor is provided with a jacket through which a heating or cooling liquid can also be passed through the inner tube. Ethylene is supplied to the reactor via conduit 3, in which prevails a pressure of 16 atm. gauge.

A diethyl aluminum hydride solution is introduced into the reactor via conduit 2 at the rate of about 4 kg. per hour. In addition to some dissolved nitrogen, hydrogen and hydrocarbons and, possibly, some traces of technical aluminum powder, this solution contains about 25% by weight of aluminum triethyl and about 2% by weight of higher alkyl groups bound to aluminum. Vent gas is discharged via conduit 4 at the rate of about 5 litres (calculated to 0° C. and 76 cm. Hg) per hour.

The pressure of the reactor is kept at about 16 atm. gauge, while the temperature of the oil circulating through the inner tube and the outer jacket is maintained at about 100° C. The temperature occurring in the reactor is, in some places, about 115° C. The reaction product is taken via liquid seal 5 and expansion valve 6 to evaporator 7, wherein prevails a pressure of 1 atm. gauge and a temperature of 100° C. Ethylene gas leaves the gas-liquid separator 9 via conduit 10 at the rate of about 130 litres (calculated to 0° C. and 76 cm. Hg) per hour, while the triethyl aluminum becomes available via conduit 11.

The vent gas, which consists mainly of nitrogen, hydrogen, ethane and butane, contains 9% by volume of ethylene.

98% by volume of the ethylene gas which becomes available via conduit 10 consists of ethylene. Consequently, this gas can be returned directly to conduit 3 via conduit 12.

In addition to some dissolved ethylene, the aluminum triethyl product which becomes available via conduit 11 contains less than 0.07% by weight of higher alkyl groups bound to aluminum.

It is not necessary that pure ethylene be used as a starting material. If the starting material is ethylene containing an inert gas, e.g. 5 or 10% by volume of hydrogen, almost all of this inert gas gets into the vent gas, which is discharged via conduit 4, so that a purer ethylene becomes available via conduit 10 than was supplied to conduit 3.

*Example 2*

Use is made of a tubular reactor 1 having an internal diameter of 100 mm., with a concentric inner tube having an external diameter of 57 mm. The reactor is about 4 meters long and is filled with aluminum rings. Furthermore, the reactor is provided with a jacket through which a heating or cooling liquid can also be passed through the inner tube. Isobutylene is supplied to the reactor via conduit 3, in which prevails a pressure of 11 atm. gauge.

Via conduit 2 a di-isobutyl aluminum hydride solution is introduced into the reactor at the rate of 9.5 kg. per hour. In addition to some dissolved hydrogen, nitrogen and hydrocarbons and, possibly, some traces of aluminum powder, this solution contains about 80% by weight of di-isobutyl aluminum hydride and about 20% by weight of tri-isobutyl aluminum. Vent gas is discharged via conduit 4 at the rate of about 140 litres (calculated to 0° C. and 76 cm. Hg) per hour. The pressure of the reactor is kept at about 11 atm. gauge, while the temperature of the oil circulating through the inner tube and the outer jacket is maintained at about 120° C.

The reaction product is taken via liquid seal 5 and expansion valve 6 to evaporator 7, wherein prevails a pressure of 1 atm. gauge and a temperature of about 120° C. Isobutylene gas leaves the gas-liquid separator 9 via conduit 10 at the rate of 2.4 kg. per hour, while the tri-isobutyl aluminum becomes available via conduit 11.

The vent gas contains about 90% by volume of isobutane, whereas it contains, in addition to some nitrogen and hydrogen, only about 2% by volume of isobutylene.

The isobutylene gas which becomes available via conduit 10 has the following composition:

98 mol percent of isobutylene
about 1 mol percent of isobutane, and
about 1 mol percent of nitrogen and hydrogen.

Consequently, this gas can be returned directly to conduit 3 via conduit 12.

It is not necessary that pure isobutylene be used as a starting material. If the starting material is isobutylene containing an inert gas, e.g. 5 or 10% by volume of hydrogen, almost all of this inert gas gets into the vent gas, which is discharged via conduit 4, so that a purer isobutylene becomes available via conduit 10 than was supplied to conduit 3.

We claim:
1. Process for preparing aluminum trialkyl, which comprises passing a liquid containing a dialkyl aluminum hydride downwardly through an elongated reactor containing contact devices, introducing a gaseous olefin into the reactor below the level at which said liquid is introduced so that said liquid and said gaseous olefin are in contact, venting a gaseous phase from the upper portion of said reactor, passing the reaction product from the lower portion of the reaction into a separation zone, and separating any gaseous constituents from the liquid phase of the reaction product containing the produced aluminum trialkyl.

2. Process according to claim 1, wherein the gaseous constituents separated from the reaction products are recycled as such to the reactor.

3. Process according to claim 1, wherein the gaseous phase is discharged from the upper portion of the reactor at such a rate that more than 90° by volume of this phase consists of the impurities introduced into the feed streams.

References Cited by the Examiner

UNITED STATES PATENTS

| | | | |
|---|---|---|---|
| 2,826,598 | 3/1958 | Ziegler et al. | 260—448 X |
| 3,013,042 | 12/1961 | Blitzer | 260—448 |

OTHER REFERENCES

"Angewandte Chemie," vol. 64 (1952), pages 325–327.

TOBIAS E. LEVOW, *Primary Examiner.*

SAMUEL BLECH, *Examiner.*

UNITED STATES PATENT OFFICE
CERTIFICATE OF CORRECTION

Patent No. 3,268,569                                                       August 23, 1966

Harm N. Mulder et al.

It is hereby certified that error appears in the above numbered patent requiring correction and that the said Letters Patent should read as corrected below.

Column 3, line 30, after "diethyl aluminum" insert -- hydride --; line 31, strike out "hydride"; column 5, line 8, for "90°" read -- 90% --.

Signed and sealed this 22nd day of August 1967.

(SEAL)
Attest:

ERNEST W. SWIDER                                    EDWARD J. BRENNER
Attesting Officer                                                 Commissioner of Patents